United States Patent [19]

Smith et al.

[11] Patent Number: 5,479,172
[45] Date of Patent: Dec. 26, 1995

[54] POWER SUPPLY AND POWER ENABLE CIRCUIT FOR AN RF/ID TRANSPONDER

[75] Inventors: Gregory M. Smith; Michael W. Yeager, both of Colorado Springs; J. Donald Pauley, Estes Park; Gary T. Carroll, Boulder, all of Colo.

[73] Assignee: Racom Systems, Inc., Englewood, Colo.

[21] Appl. No.: 194,707

[22] Filed: Feb. 10, 1994

[51] Int. Cl.$^6$ ................................................. G01S 13/75
[52] U.S. Cl. .............................................................. 342/51
[58] Field of Search .......................... 342/42, 44, 51, 342/198; 340/825.34, 825.54, 572

[56] References Cited

U.S. PATENT DOCUMENTS

| | | | |
|---|---|---|---|
| 3,895,239 | 7/1975 | Alaspa | 307/268 |
| 4,103,187 | 7/1978 | Imamura | 307/251 |
| 4,300,065 | 11/1981 | Remedi et al. | 307/571 |
| 4,385,245 | 5/1983 | Ulmer | 307/594 |
| 4,409,501 | 10/1983 | Eickerman et al. | 307/594 |
| 4,473,759 | 9/1984 | Mahabadi | 307/350 |
| 4,812,679 | 3/1989 | Mahabadi | 307/272 |
| 4,858,182 | 8/1989 | Pang et al. | 365/156 |
| 4,928,266 | 5/1990 | Abbott et al. | 365/189.01 |
| 5,121,358 | 6/1992 | Slemmer et al. | 365/226 |
| 5,134,310 | 7/1992 | Mobley et al. | 307/270 |
| 5,166,545 | 11/1992 | Harrington | 307/272.3 |

OTHER PUBLICATIONS

Ramtron Corporation, R2 92490, Ramtron Brochure, RTx 0801 Ramtag™, 256–Bit Passive Nonvolatile RF/ID Tag Engineering Prototype, 1990, pp. 1–6.

Ramtron International Corporation, Ramtron Brochure, FM1208S Fram® Memory, 4,096–Bit Nonvolatile Ferroelectric RAM Product Specification, R3 Aug., 1993, pp. 1–8.
United States Statutory Invention Registration, Reg. No. H64, Published May 6, 1986, Hanafy E. Maleis, Appl. No. 521,059.

*Primary Examiner*—Daniel T. Pihulic
*Attorney, Agent, or Firm*—Peter J. Meza; William J. Kubida; Holland & Hart

[57] ABSTRACT

A power supply self-contained within a portable RF/ID transponder includes a full wave rectifier having an input for receiving an antenna signal and outputs for providing power supply and ground voltages, wherein the power supply voltage has a time varying voltage waveform corresponding to the electric field generated by a reader/controller. The power supply further includes a clamping circuit for regulating the power supply voltage and a ferroelectric filter/storage capacitor coupled between the power supply and ground outputs of the full wave rectifier. The power supply further includes a power enable circuit for constantly monitoring the supply voltage waveform and for providing a power enable indication after an initial portion of the supply voltage waveform rises above a predetermined power-up threshold level and for removing the power enable indication when a terminal portion of the supply voltage waveform falls below a predetermined power-down level. The power-up and power-down thresholds describe a proper voltage range of operation for the ferroelectric memory in the transponder. The power enable indication is provided to the ferroelectric memory so that the memory is only operated when the power supply voltage is within the proper range so that data is valid during read and write operations.

22 Claims, 14 Drawing Sheets

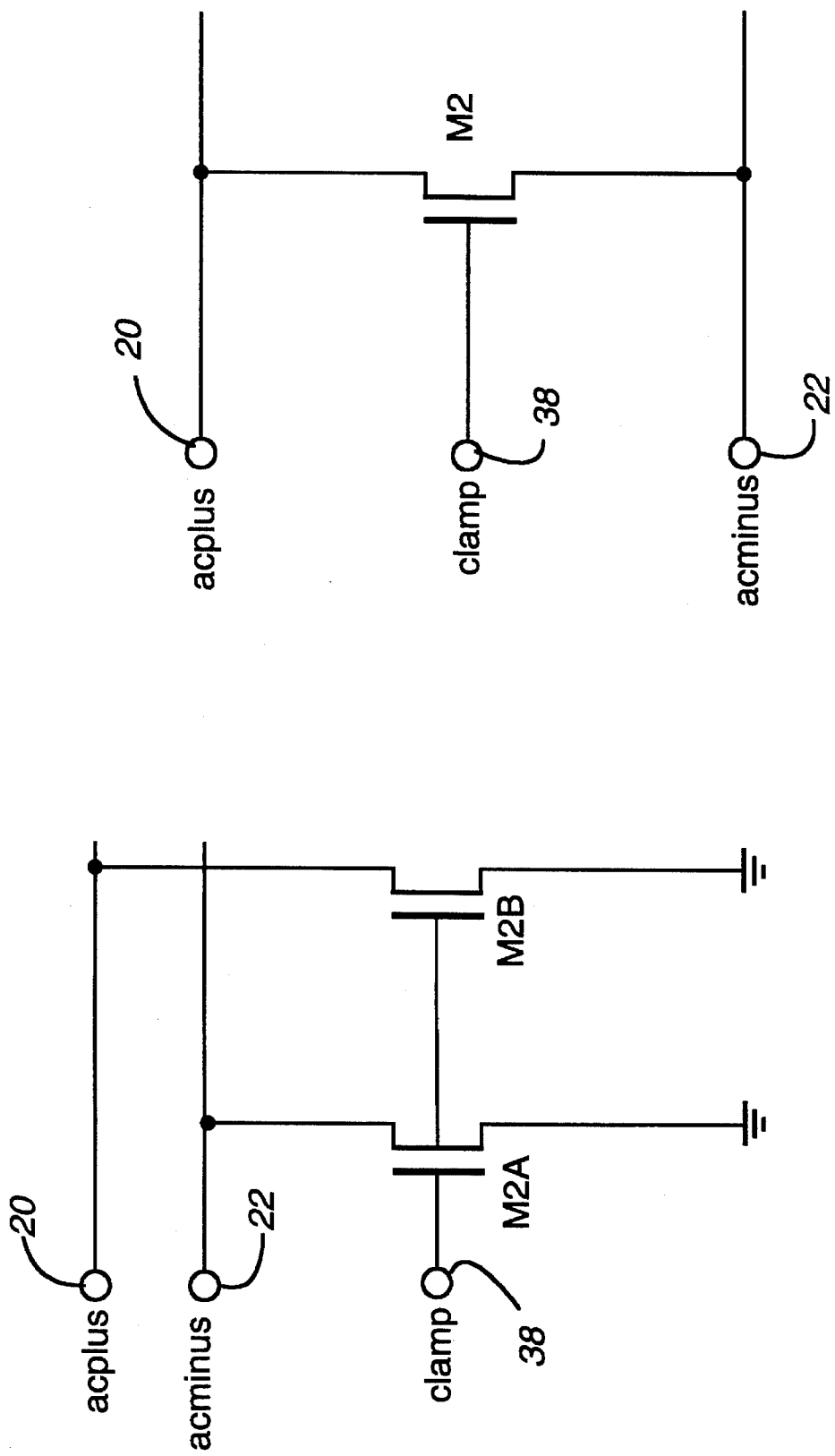

POWER SUPPLY AND POWER ENABLE CIRCUIT FOR AN RF/ID TRANSPONDER

CROSS REFERENCE TO RELATED APPLICATIONS

The present invention is related to the inventions described in the following U.S. patent applications:

Ser. No. 08/194,616 (Attorney Docket No. 34980.8301, RACOM 001), entitled "Passive RF Transponder and Method";

Ser. No. 08/194,694 (Attorney Docket No. 34980.8305, RACOM 002), entitled "Integrated Asynchronous FSK Detector and Method";

Ser. No. (Attorney Docket No. 34980.8302, RACOM 003), entitled "Communications System Utilizing FSK/PSK Modulation Techniques";

Ser. No. 08/194,708 (Attorney Docket No. 34980.8303, RACOM 004), entitled "FSK Detector Circuit and Method"; and Ser. No. 08/195,162 (Attorney Docket No. 34980.8307, RACOM 005), now U.S. Pat. No. 5,444,421, entitled "Low Power Consumption Oscillator Using Multiple Transconductance Amplifiers", all of which applications are filed concurrently herewith on Feb. 10, 1994, and assigned to the assignee of the present invention, the disclosures of which are hereby specifically incorporated by this reference.

BACKGROUND OF THE INVENTION

This invention relates generally to transponders for use with a radio-frequency identification system ("RF/ID"). More particularly, the present invention relates to a power supply and power sensing circuit for operating an integrated circuit having a ferroelectric memory that is contained within a card-like mobile RF/ID transponder.

Referring now to FIG. 1A, a mobile RF/ID transponder card 10 is shown including an antenna coil 12 having positive and negative output conductors 20 and 22 respectively designated ACPLUS and ACMINUS coupled to a single integrated circuit 14. The RF/ID transponder card 10 is designed to communicate with a reader/controller (not shown in FIG. 1A), sending and receiving data through the antenna coil 12, and storing data in a ferroelectric memory resident of the integrated circuit 14. The RF/ID transponder card 10 need only be placed in the electric field of the reader to initiate communication; actual physical contact with the reader is not required. Antenna coil 12 is fabricated into the transponder card 10, which is about the size of a normal credit card. Typically, antenna coil 12 has several coils wrapped about the periphery of transponder 10. The inductance of antenna 12 is determined by the communication carrier frequency used to communicate between transponder 10 and the reader/controller. Antenna 12, in conjunction with a parallel capacitor, not shown, forms a resonant circuit for locking on to the carrier frequency. For example, a nominal carrier frequency of 125 kHz could be locked on to by an antenna 12 having an inductance of 4.2 millihenries and a capacitor having a capacitance of 390 picofarads.

A single integrated circuit 14 includes a power supply circuit 16 and an RF/ID circuit 18, each having inputs/outputs coupled to conductors 20 and 22 for receiving the signals from antenna 12. The power supply 16 uses the AC signals from antenna 12 to create the power enable, power supply and ground signals on conductors 24, 26, and 28. These signals are respectively designated PWREN, VDD, and GND. The PWREN, VDD, and GND signals are received by RF/ID circuitry 18. RF/ID circuitry 18 is also coupled to antenna 12, and includes transmitter circuits, clock circuits, protocol circuitry, signal processing, ferroelectric memory, and other circuits for communicating with the reader/controller. The VDD and GND signals are regulated power supply signals generated from the AC antenna signals on conductors 20 and 22. VDD and GND are constantly supplied to RF/ID circuit 18, regardless of the voltage value of these signals. A proposed RF/ID tag utilizing FRAM® technology roughly corresponding to the block diagram of FIG. 1A is shown and described in the "RTx 0801 Ramtag" literature, © 1990 by Ramtron Corporation, which is hereby incorporated by reference. It is important to note that threshold levels of the PWREN signal are not described in this literature, nor is any circuit embodiment for the power supply or power enable circuit shown.

Many potential applications exist for RF/ID transponders that may be readily carried by a user so that its memory contents can be read when placed near the reader. A still greater number of applications can be found for a true card-sized RF/ID transponder such as transponder 10 to which data may be written as well. A still greater number of applications can be found in which a sufficiently fast memory writing time allows interrogation of the memory contents within a given transaction period.

As a practical matter, the desirable card form factor of the transponder generally precludes the use of a continuous on-board power source such as a battery, which in turn eliminates the possibility of data retention through the use of conventional volatile semiconductor storage devices such as dynamic random access memory ("DRAM") or battery backup static random access memory ("BBSRAM"). Furthermore, the long write times, high-voltage, and high power requirements for conventional non-volatile memories such as electrically erasable programmable read only memory ("EEPROM") and non-volatile random access memory ("NOVRAM") render their use in a transponder energized solely by the signal received by the antenna extremely difficult.

An alternative non-volatile memory technology for retention of data in a passive RF transponder includes the use of a ferroelectric random access memory ("FRAM® ") integrated circuit utilizing a proprietary lead-zirconate-titanate ("PZT") ceramic thin film available from Ramtron International Corporation of Colorado Springs, Colo. Through the use of FRAM® technology, it is possible to obtain sufficient power to write to the memory array and power associated logic from a relatively weak external RF field or to obtain a greater range of operation.

One problem with ferroelectric memories is that sufficient voltage must be developed across the memory cell so that all of the domains in the ferroelectric dielectric material are polarized into one of two stable states. Insufficient voltage can result in not all of the domains being polarized, which in turn leads to lower available switching charge and possible loss of data during both reading and writing. Turning now to FIG. 1B several hysteresis loops are shown that illustrate the behavior of the ferroelectric dielectric material. The x-axis represents voltage measured across the memory cell, with positive voltage representing one polarization state, and negative voltage representing the other polarization state. The y-axis represents available charge when switching from one polarization state to the other. Considering loop L1, sufficient voltage $V_1$, about five volts in the case of PZT, is developed across the ferroelectric material.

At five volts, almost all of the domains within the ferroelectric material have switched. At voltages in excess of five volts, increasingly few domains are available to be switched and the ferroelectric material is considered to be fully saturated. The total switched charge associated with loop $L_1$ is shown to be about $Q_1$ micro-coulombs and is typically large enough to be easily sensed by a conventional integrated circuit sense amplifier. Considering loop $L_2$, a voltage $V_2$ less than five volts, for example three volts, is developed across the ferroelectric material. At three volts only some of the domains within the ferroelectric material have switched. The total switched charge associated with loop $L_2$ is shown to be about Q2 micro-coulombs, which may or may not be sufficient to be sensed by a conventional sense amplifier. In loop $L_3$, the driving voltage $V_3$ is even less, with a correspondingly low switched charge $Q_3$. The $Q_3$ charge may be insufficient to be sensed correctly by a conventional sense amplifier.

An example of a ferroelectric memory cell architecture for use in transponder 10 is shown in FIG. 1C. The two transistor, two capacitor ("2T–2C") ferroelectric memory cell in FIG. 1C uses a complementary transistor structure in which ferroelectric capacitor CC1 stores the logic state in one polarization state, and wherein capacitor CC2 stores the logic state in the opposite polarization state. The capacitors are accessed through series-connected transistors M1 and M2. As in a conventional memory cell, the memory cell of FIG. 1C contains complementary bit lines and a word line. Unlike conventional memory cells, the memory cell of FIG. 1C also includes a plate line, which is pulsed during both reading and writing. The operation of a ferroelectric 2T–2C memory cell is further described in U.S. Pat. No. 4,873,664 entitled "Self Restoring Ferroelectric Memory", which is hereby incorporated by reference. The memory cell of FIG. 1C would ideally be integrated into an array of such cells organized into rows and columns.

Accordingly, what is desired is an integrated circuit embodiment and method for allowing operation of the ferroelectric memory on the RF/ID tag only when sufficient internal supply voltage exists for proper memory operation so that data will not be corrupted.

SUMMARY OF THE INVENTION

It is, therefore, a principal object of the present invention to operate a ferroelectric memory resident on a portable RF/ID transponder at a sufficient voltage so that data is valid during both read and write operations and that such data is retained.

It is another object of the invention to generate power and ground signals, as well as a power enable indication solely from the energy delivered by the reader/controller to the antenna on the transponder.

It is an advantage of the invention that the power supply and power enable circuit can be integrated on the same integrated circuit as the ferroelectric memory circuit and other RF/ID circuitry.

It is a further advantage of the invention that the power enable signal to control the operation of the ferroelectric memory is generated solely from internal reference and trigger signals, and additional external reader/controller signals are not required.

According to the present invention a power supply self-contained within a portable RF/ID transponder includes a full wave rectifier having an input for receiving an antenna signal and outputs for providing power supply and ground voltages, wherein the power supply voltage has a time varying voltage waveform corresponding to the electric field generated by a reader/controller. The power supply further includes a clamping circuit for regulating the power supply voltage and a ferroelectric filter/storage capacitor coupled between the power supply and ground outputs of the full wave rectifier. The power supply further includes a power enable circuit for constantly monitoring the supply voltage waveform and for providing a power enable indication after the supply voltage waveform rises above a predetermined power-up threshold level and for removing the power enable indication when the supply voltage waveform falls below a predetermined power-down level. The power enable circuit further includes circuitry for generating distinct first and second trigger voltages that are each proportional to the power supply voltage, circuitry for comparing the first trigger voltage to an internally generated reference voltage to provide the power enable indication, and circuitry for subsequently comparing the second trigger voltage to the reference voltage to remove the power enable indication. The power-up and power-down thresholds describe a proper voltage range of operation for the ferroelectric memory in the transponder. The power enable indication is provided to the ferroelectric memory so that the memory is only operated when the power supply voltage is within the proper range so that data is valid during both read and write operations. The hysteresis of the power enable indication also guarantees that once the transponder is within sufficient range of the reader/controller to generate a power enable indication, any subsequent transactions that may affect the power supply level will not remove the power enable indication and power down the transponder.

The foregoing and other objects, features and advantages of the invention will become more readily apparent from the following detailed description of a preferred embodiment of the invention which proceeds with reference to the accompanying drawings.

BRIEF DESCRIPTION OF THE DRAWINGS

FIGS. 2A and 2B are schematic diagrams of alternative clamping circuits to that which is shown in FIG. 2;

DETAILED DESCRIPTION

The PWREN signal allows the RF/ID circuit 18 to reset logic and memory circuits, state machines, or any other circuit that must be put into a known initial state. The effect of the PWREN signal on other circuit blocks in a preferred embodiment of the RF/ID circuitry is further described in a copending patent entitled "Passive RF Transponder and Method" Ser. No. 08/194,616 (Attorney Docket No. 34980.8301, RACOM 001) which is also assigned to the assignee of the present invention and is hereby incorporated by reference. The PWREN signal of the present invention is not simply a reset signal, or more specifically a "power on reset" signal, but is asserted as long as the power supply voltage is within certain predetermined limits to ensure proper operation of the ferroelectric memory in RF/ID circuit 18. The PWREN signal also has an associated hysteresis that is important in the operation of transponder 10. The particulars of the PWREN signal and the operation of the power supply 16 are described in greater detail below.

Figure 1A:
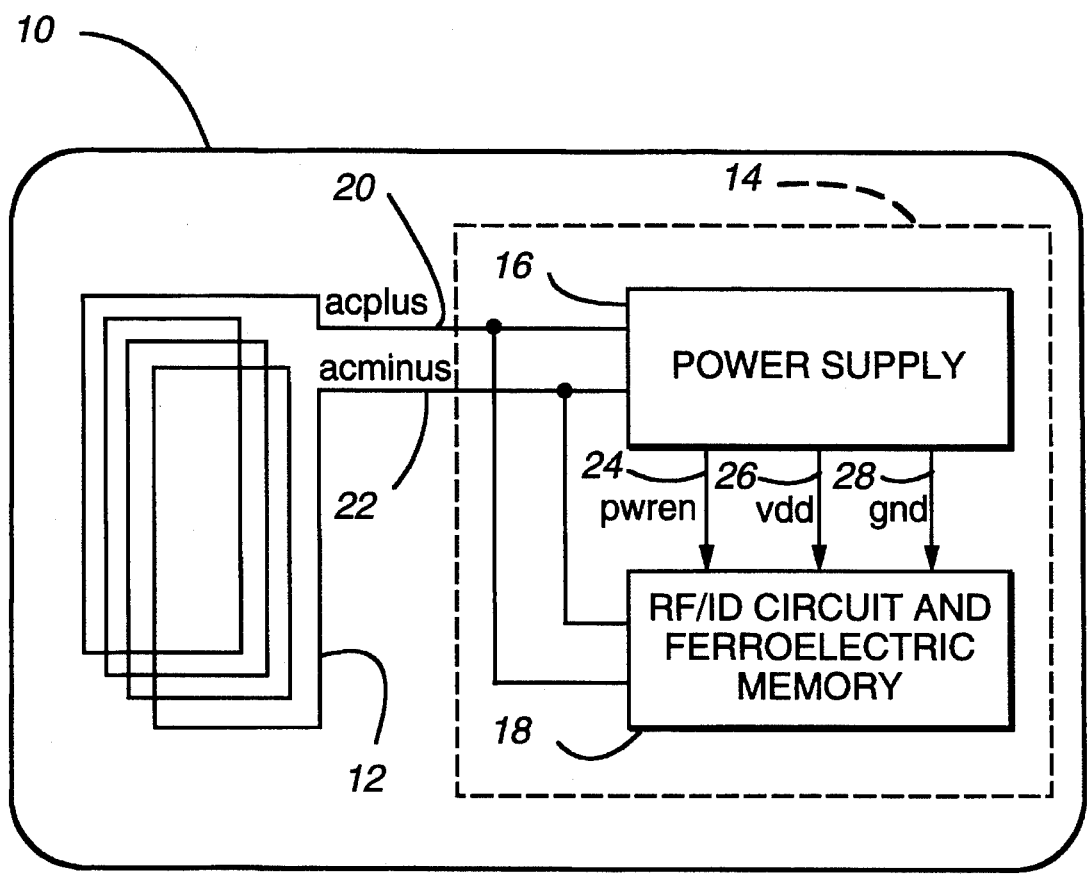
FIG. 1A is a prior art block diagram of a portable RF/ID card including a power supply and other RF/ID circuitry.
Figure 1B:
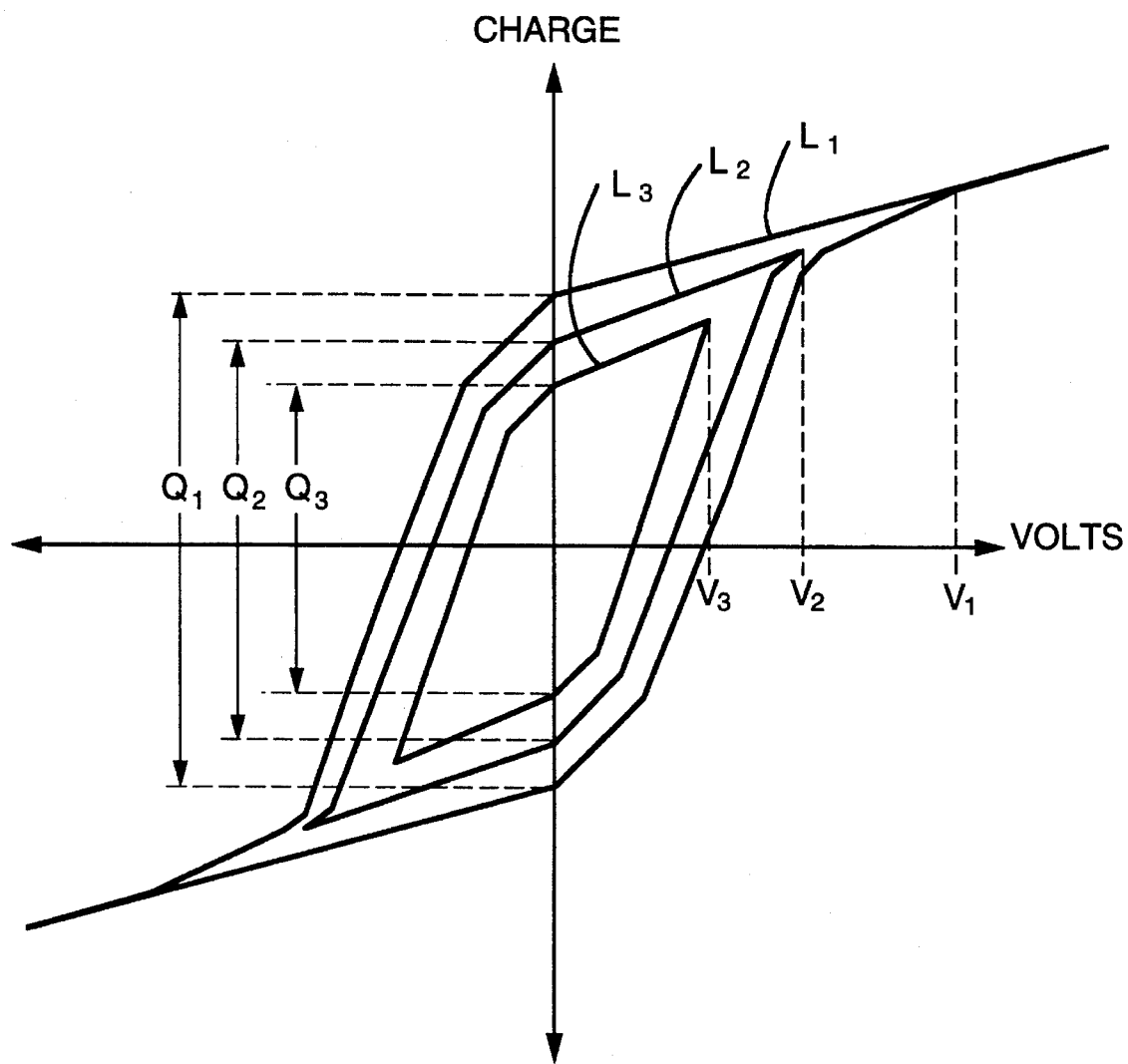
FIG. 1B is a hysteresis loop diagram illustrating the proper operation of polarizing a ferroelectric film to permanently store data.
Figure 1C:
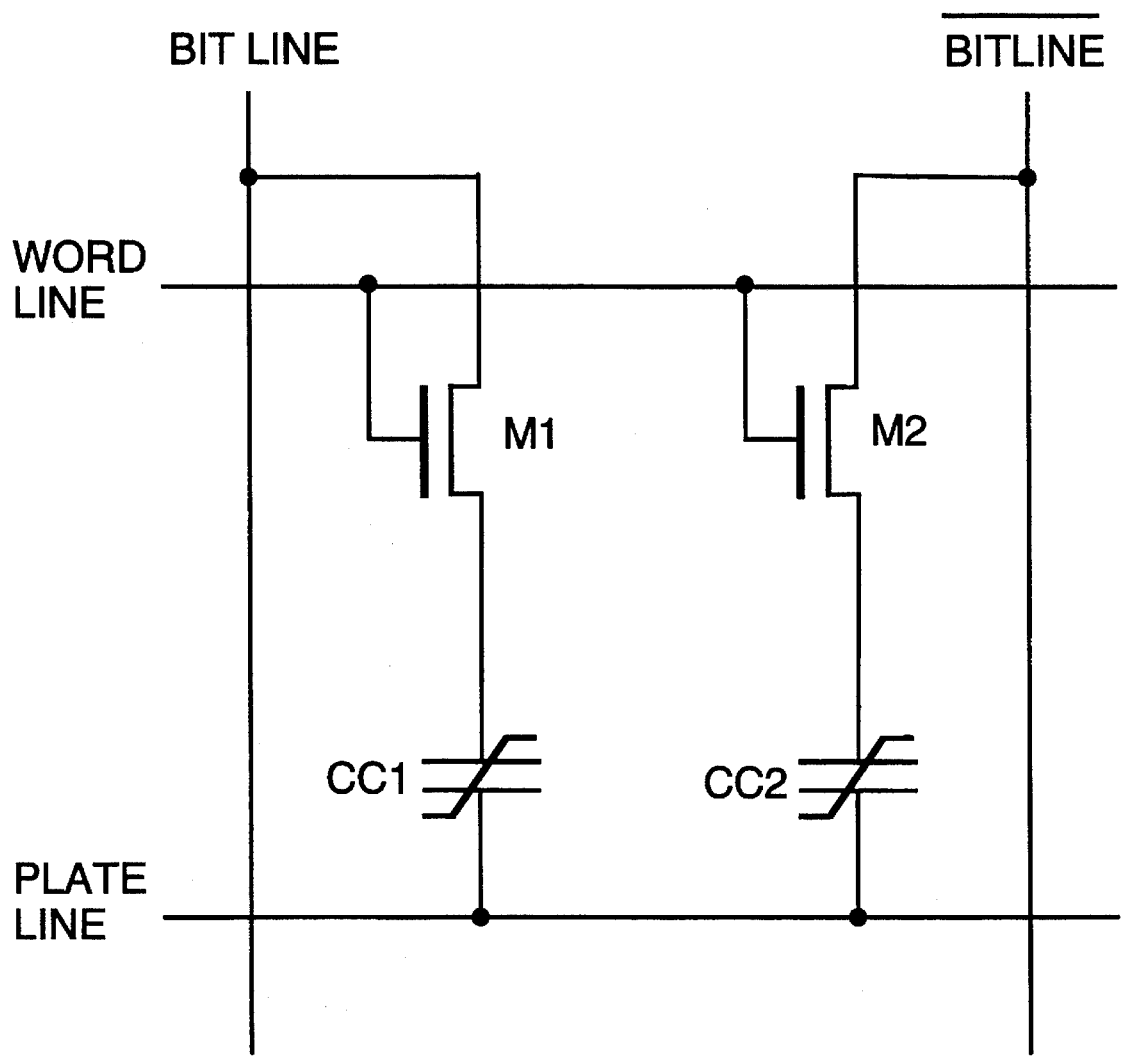
FIG. 1C is a schematic diagram of a 2T–2C ferroelectric memory cell for use in the RF/ID card.
Figure 2:
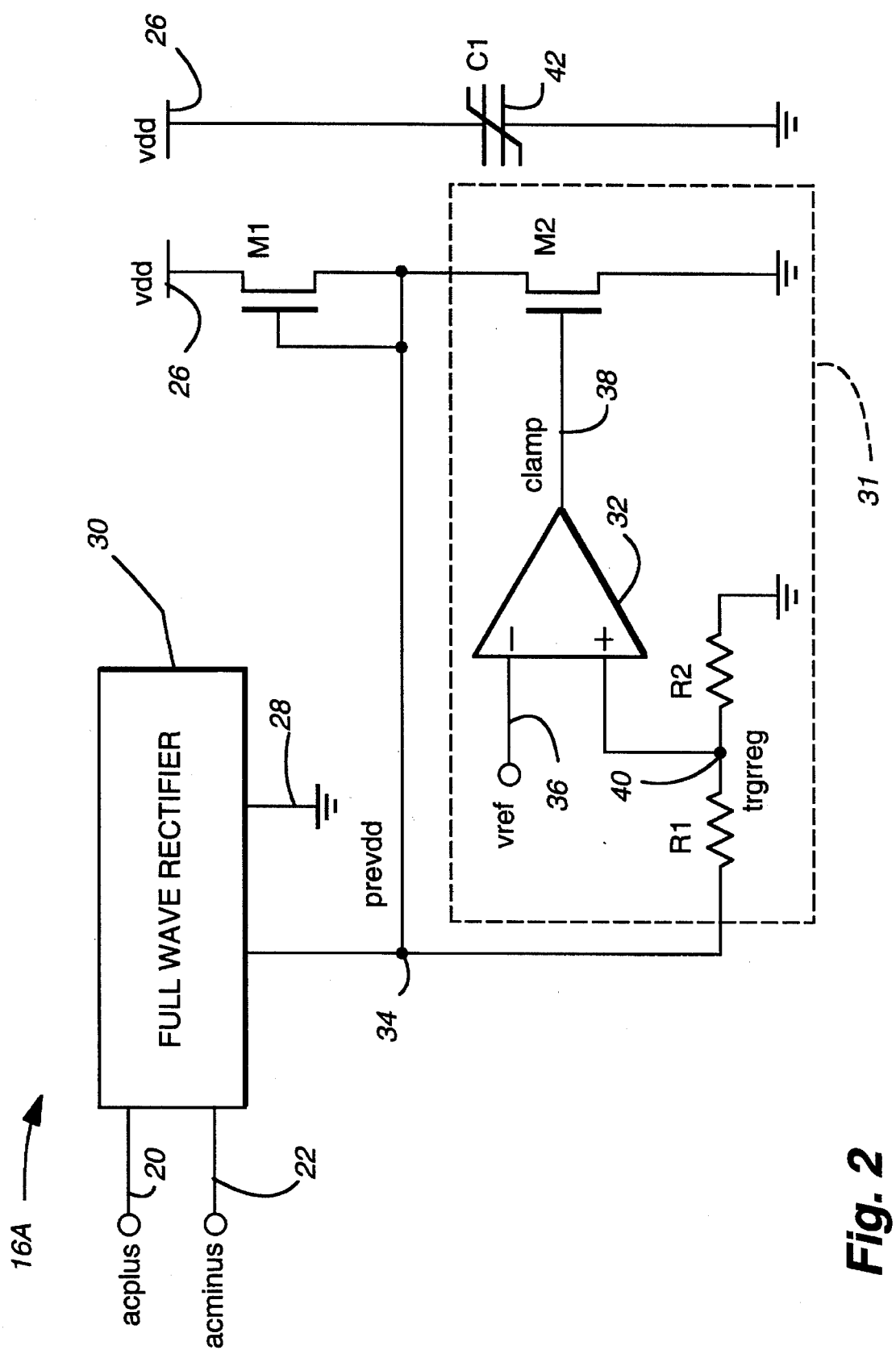
FIG. 2 is a block/schematic diagram of a first portion of the power supply according to the present invention.

Referring now to FIG. 2, a first portion 16A of integrated power supply 16 includes a full wave rectifier 30, a clamping circuit 31, a diode-connected transistor M1, and a ferroelectric capacitor C1. The full wave rectifier 30 has inputs for receiving the antenna signal on conductors 20 and 22, and outputs for providing rectified power supply and ground voltages on conductors 34 and 28, respectively. The power supply voltage has a corresponding time varying voltage waveform as transponder 10 is introduced to and removed from the electric field of the reader. The unfiltered power supply voltage on conductor 34 is designated PREVDD, and is coupled to the VDD power supply voltage on conductor 26 through diode-connected transistor M1. The anode of diode-connected transistor M1 is coupled to PREVDD conductor 34 and the cathode forms the VDD power supply voltage output at conductor 26. A filter capacitor 42, designated C1, is coupled across the VDD power supply and GND outputs to filter the VDD power supply. Capacitor 42 is ideally a ferroelectric capacitor having a high dielectric constant so that it can be integrated together with the other power supply circuitry while maintaining a high capacitance value and consuming a minimum amount of integrated circuit die area. In a preferred embodiment of the present invention capacitor 42 has a nominal value of about 2.3 nanofarads. Capacitor 42 is sized according to the filter and power supply holding requirements of a particular application and will change with nominal power supply voltage required, frequency of the carrier frequency, amount of ripple tolerated, as well as other factors.

The first portion 16A of the power supply 16 also includes a clamping circuit 31 for regulating the power supply voltage. Clamping circuit 31 sinks current from the PREVDD power supply output of the full wave rectifier 30 in response to an increase in the power supply voltage above a nominal level. Clamping circuit 31 includes an operational amplifier 32, a clamping transistor M2, and a voltage divider circuit including resistors R1 and R2. The voltage divider circuit samples the PREVDD voltage on conductor 34 to supply a voltage proportional to the unfiltered power supply voltage at the center tap 40. The voltage on center tap 40 is designated TRGRREG. Resistors R1 and R2 have nominal values of 1.453 megohms and 592.5 kohms, respectively, for a nominal current requirement of about 2.4 microamps at a nominal PREVDD power supply voltage of about five volts. The divider has a ratio factor of about 0.29, resulting in a nominal level of about two volts when the PREVDD voltage is about seven volts. Operational amplifier 32 compares the divider center tap voltage 40 to a reference voltage designated VREF of about two volts at node 36 to generate an output error voltage on conductor 38 designated CLAMP. The CLAMP voltage is impressed onto the gate of clamp transistor M2 in order to sink current out of the PREVDD voltage output of rectifier 30. Removing current from rectifier 30 has the effect of lowering the PREVDD voltage, and consequently the VDD voltage as well as a result of the VDD load current flowing through transistor M1.

The transistor-level circuits pertaining to operational amplifier 32 and full wave rectifier 30 shown in FIG. 2 are described in detail below with reference to FIGS. 5 and 6.

Turning now to FIGS. 2A and 2B, alternative clamping circuit configurations for clamping transistor M2 are shown. These alternative circuits are also effective for clamping the PREVDD voltage, but in addition minimize the voltage dropped across full wave rectifier 30. In FIG. 2A, clamping transistor M2 has been replaced by a pair of transistors, M2A and M2B. As in the previous circuit, the gates of transistors M2A and M2B are coupled to node 38 to receive the CLAMP signal, and the sources of transistors M2A and M2B are coupled to ground. However, in FIG. 2A, the drain of transistor M2A is coupled directly to conductor 22 to receive the ACMINUS signal and the drain of transistor M2B is coupled directly to conductor 20 to receive the ACPLUS signal. In FIG. 2B, the gate of clamping transistor M2 is coupled to node 38 to receive the CLAMP signal, and the current path of transistor M2 is coupled between conductors 20 and 22.

Figure 3:
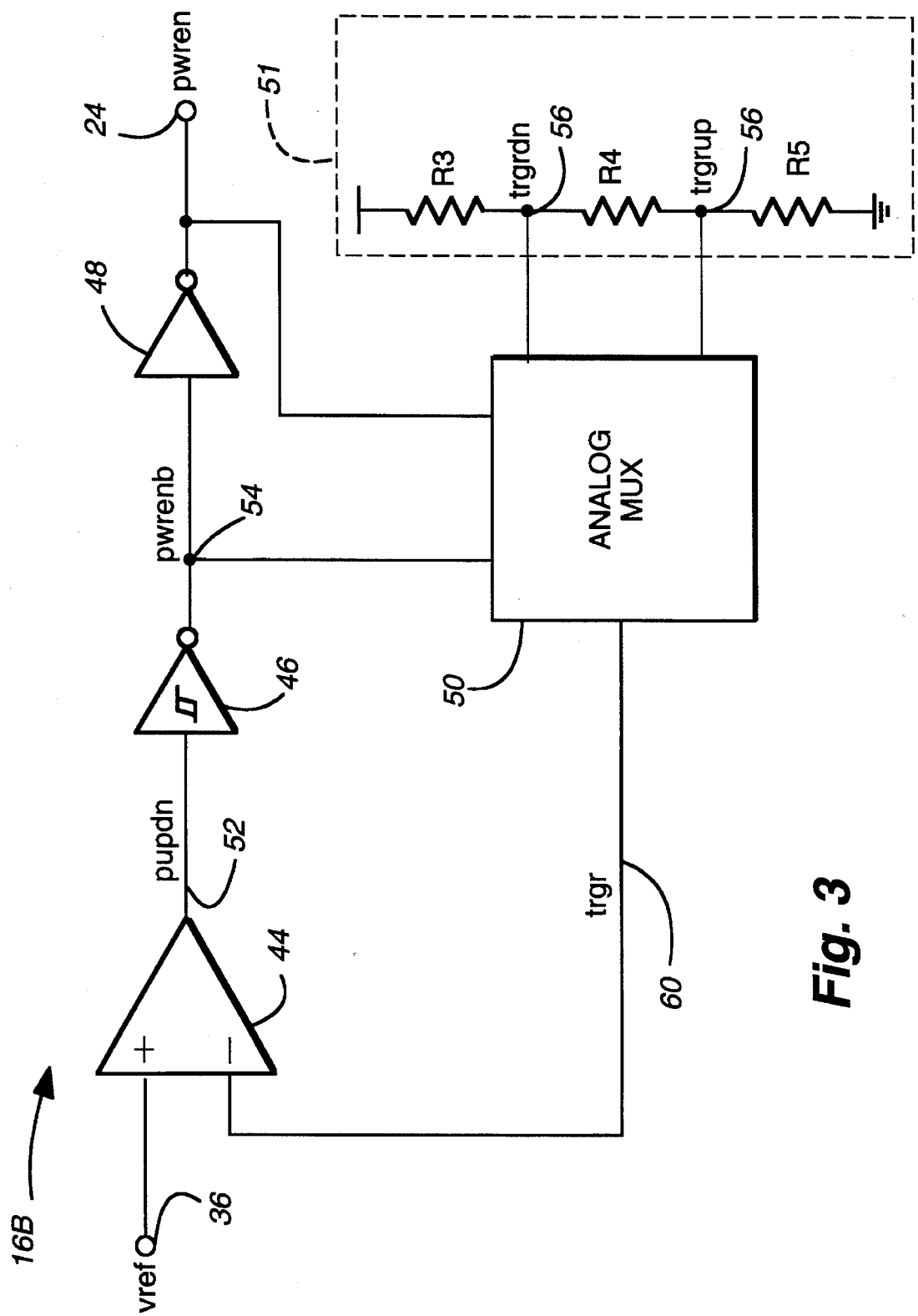
FIG. 3 is a block/schematic diagram of a second portion of the power supply according to the present invention.

Referring now to FIG. 3, a second portion 16B of power supply circuit 16 is a power enable circuit for constantly monitoring the VDD supply voltage waveform and for providing a power enable indication. As is further explained below, circuit 16B provides a power enable indication PWREN after an initial portion of the supply voltage waveform crosses a predetermined power-up threshold level and removes the power enable indication when a terminal portion of the supply voltage waveform crosses a predetermined power-down level, which is less than the power-up threshold level. In other words, the PWREN signal exhibits hysteresis. Hysteresis is necessary so that once transponder 10 is within sufficient range of the reader/controller to generate a power enable indication, any subsequent transactions that may affect the power supply level will not remove the power enable indication and power down the transponder. The power enable circuit generates distinct first and second trigger voltages, designated TRGRDN and TRGRUP at nodes 56 and 58, respectively. Each of the trigger voltages is proportional to the VDD power supply voltage. It is important to note that, as transponder 10 is introduced into and removed from the electric field of the reader/controller, the VDD voltage is not constant, but varies with the strength of the generated electric field. Each of the trigger voltages tracks the dynamic VDD voltage, but each with a different ratio. Each of the trigger voltages are sequentially compared to the internally generated reference voltage at node 36 to initially provide and then remove the power enable indication.

The power enable circuit 16B includes a comparator 44, Schmitt trigger inverter 46, inverter 48, analog multiplexer 50, and a trigger level generating circuit 51. The positive input of comparator 44 receives the VREF reference voltage at node 36. The negative input is coupled to other circuitry through conductor 60. The signal on conductor 60 is designated TRGR. The output, through intermediate circuitry, provides the power enable indication, designated PWREN, at node 24. The conductor 52 coupled to the output of comparator 44 carries a signal designated PUPDN. Schmitt trigger inverter 46 has an input coupled through conductor 52 to the output of comparator 44. The output of Schmitt trigger inverter 46 is coupled to the input of inverter 48 through conductor 54. The signal on conductor 54 is designated PWRENB, or the inverted PWREN signal. The output of inverter 48 generates the PWREN signal at node 24. Effectively, comparator 44 has inverting and non-inverting outputs at nodes 54 and 24.

The trigger level generating circuit 51 includes resistors R3, R4, and R5 in series connection in which intermediate nodes 56 and 58 generate trigger voltages TRGRDN and TRGRUP, respectively. Resistor R3 receives the VDD power supply voltage and resistor R5 is coupled to ground. Since the trigger level generating circuit 51 is a passive resistor divider circuit coupled between the supply voltage and ground, the trigger voltages are each proportional to the VDD power supply voltage. The control inputs of analog multiplexer 50 are controlled by signals PWRENB and PWREN, which are indirectly generated by comparator 44. The inputs of analog multiplexer 50 are coupled to trigger generating circuit 51 for receiving the TRGRDN and TRGRUP trigger voltages. The output of analog multiplexer 50 is coupled to the negative input of comparator 44. Depending upon the polarity of the PWRENB and PWREN signals, either analog trigger voltage TRGRDN or TRGRUP is passed through to become the TRGR signal on conductor 60.

The nominal values of resistors R3, R4, and R5 are 1.168 megohms, 76.5 Kohms, and 756.5 Kohms, respectively. The nominal reference voltage, VREF, is about two volts. Node 58 (junction of resistors R4 and R5) generates the higher voltage TRGRUP trigger signal. In the TRGRUP mode the power enable circuit 16B monitors the initial portion of the VDD waveform and the upper range of the acceptable VDD power supply voltage must be sensed. The resistor ratio in this mode is 1.245 megohms to 756.5 Kohms. A voltage of two volts at node 58 represents a sensed VDD voltage of about 5.3 volts, or the minimum initial power supply voltage that is acceptable for generating the PWREN signal. Conversely, node 56 (junction of resistors R3 and R4) generates the lower voltage TRGRDN trigger signal. In the TRGRDN mode the power enable circuit 16B monitors the terminal portion of the VDD waveform and the lower range of the acceptable VDD power supply voltage must be sensed. The resistor ratio in this mode is 1.168 megohms to 833 Kohms. A voltage of two volts at node 56 represents a sensed VDD voltage of about 4.8 volts, or the minimum terminal power supply voltage that is acceptable for generating the PWREN signal.

The transistor-level circuits of comparator 44, Schmitt trigger inverter 46, and analog multiplexer 50 shown in FIG. 3 are described in detail below with reference to FIGS. 7, 8, and 9.

Figure 4:
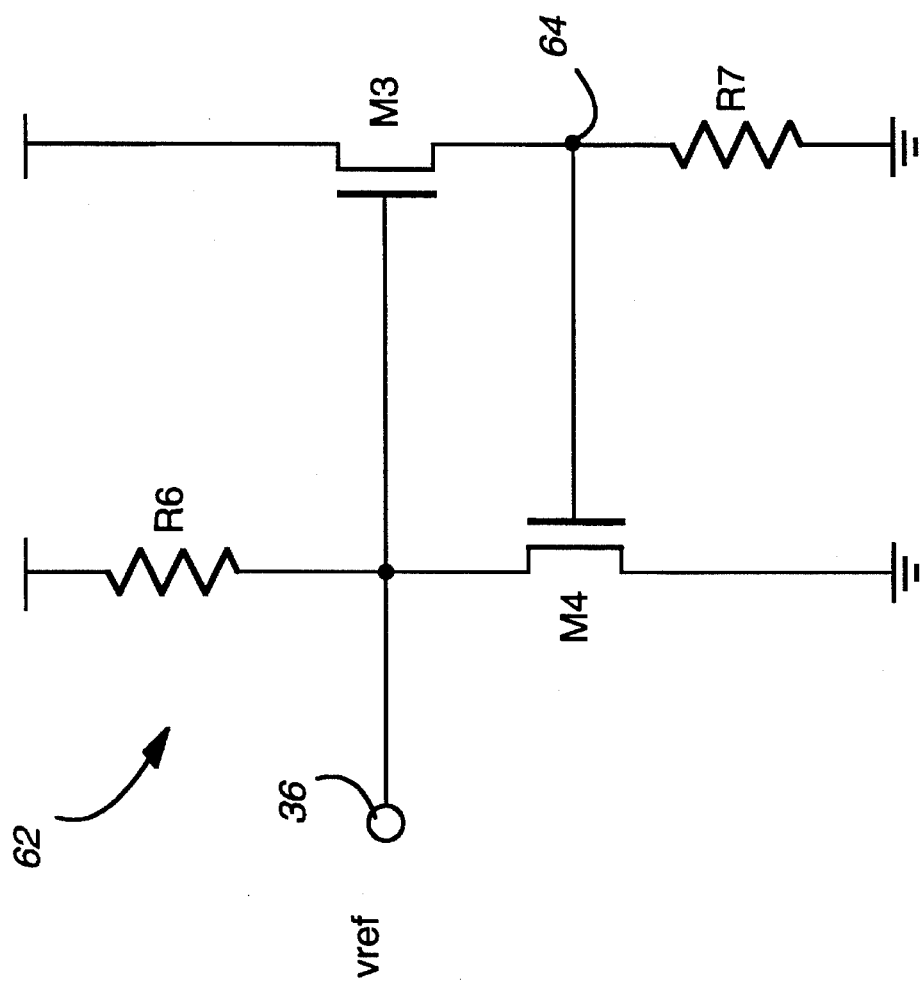
FIGS. 4–9 are schematic diagrams of various circuit blocks used in the power supply according to the present invention.

The transistor-level schematic diagram of a temperature and voltage compensated reference generator circuit is shown in FIG. 4. Voltage reference generator 62 supplies the reference voltage, VREF, for both portions of power supply 16 and includes a reference node 36 for supplying the reference voltage, resistors R6 and R7, and transistors M3 and M4. Resistor R6 is coupled between reference node 36 and the VDD power supply voltage and resistor R7 is coupled between node 64 and ground. The current path of the transistor M3 is coupled between VDD and node 64 and the gate is coupled to reference node 36. The current path of transistor M4 is coupled between reference node 36 and ground and the gate is coupled to node 64. The reference voltage generated at node 36 is approximately 2–2.2 volts, and is not directly dependent upon the VDD power supply voltage. The reference generator 62 is adapted from U.S. Pat. No. 5,134,310, entitled "Current Supply Circuit for Driving High Capacitance Load in an Integrated Circuit" to Mobley et al., issued Jul. 28, 1992, which is hereby incorporated by reference. In particular, reference generator 62 is adapted from the reference circuit shown in Mobley et al. FIG. 2, with the load connection shorted to VDD, and the reference voltage taken at node 20. The description of the operation of the FIG. 2 reference circuit of Mobley is found at column 5, lines 13–58.

Figure 5:
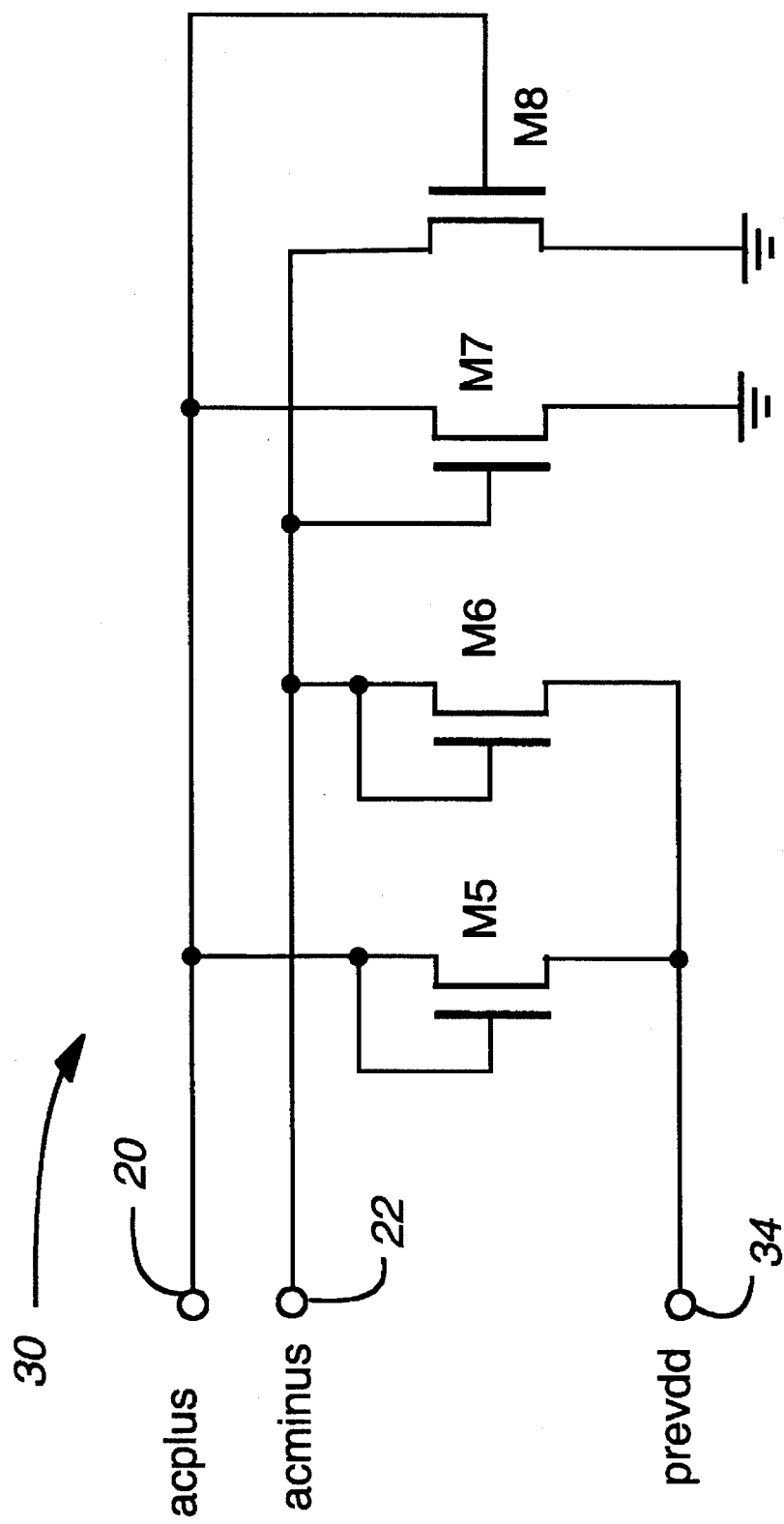

Returning to the description of the first power supply portion 16A, the transistor-level diagram of full wave rectifier 30 is shown in FIG. 5. Full wave rectifier 30 is used in the present embodiment to reduce the amount of current injected into the integrated circuit substrate. The well-known prior art four diode full wave rectifier can inject current into the substrate, potentially de-biasing circuit components and creating other problems such as latch-up. In rectifier 30, two diodes of the prior art design are replaced with transistors. Transistors M5 and M6 are configured as diodes, the anode of transistor M5 being coupled to ACPLUS conductor 20, and the anode of transistor M6 being coupled to ACMINUS conductor 22. The cathodes of diode-connected transistors M5 and M6 are both connected to PREVDD conductor 34. Transistors M7 and M8 operate as transistors and not diodes, wherein the current path of transistor M7 is coupled between ACPLUS and GND, and the gate receives the ACMINUS signal. The current path of transistor M8 is coupled between ACMINUS and GND, and the gate receives the ACPLUS signal. The problem with the prior art and the operation of full wave rectifier 30 is described in detail in US Statutory Invention Registration No. H64, entitled "Full-Wave Rectifier for CMOS IC Chip" to Maleis, published May 6, 1986, which is hereby incorporated by reference. In particular, see the circuit of FIG. 3 and the accompanying description.

Figure 6:
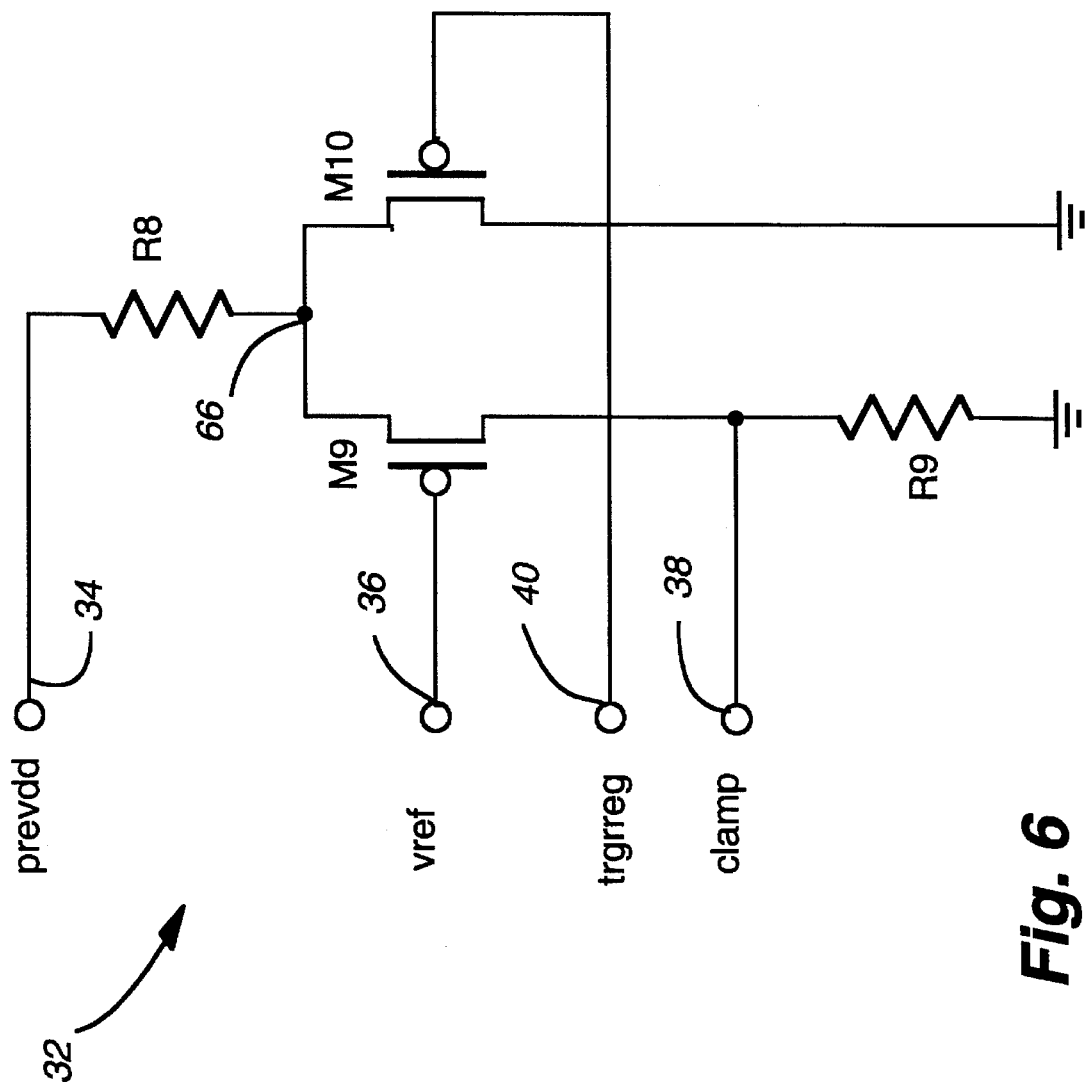

The transistor-level diagram of operational amplifier 32 previously referred to with respect to FIG. 2 is shown in FIG. 6. Since operational amplifier 32 has a single output 38 for providing the CLAMP signal, a single load resistor R9 is used. Bias current for operational amplifier 32 is provided by a single current-setting resistor R8. Active P-channel devices M9 and M10 form a current-steering differential transistor pair. Resistor R8 is coupled between PREVDD node 34 and node 66. The sources of transistors M9 and M10 are coupled together and to node 66. The gate of transistor M9 is coupled to reference node 36, and the gate of transistor M10 is coupled to TRGRREG node 40. The drain of transistor M9 is coupled to CLAMP node 38 and to R9, the other end of R9 being coupled to GND. The drain of transistor M10 is coupled to ground. The nominal values of resistors R8 and R9 are 200 kohms and 100 kohms, respectively.

Figure 7:
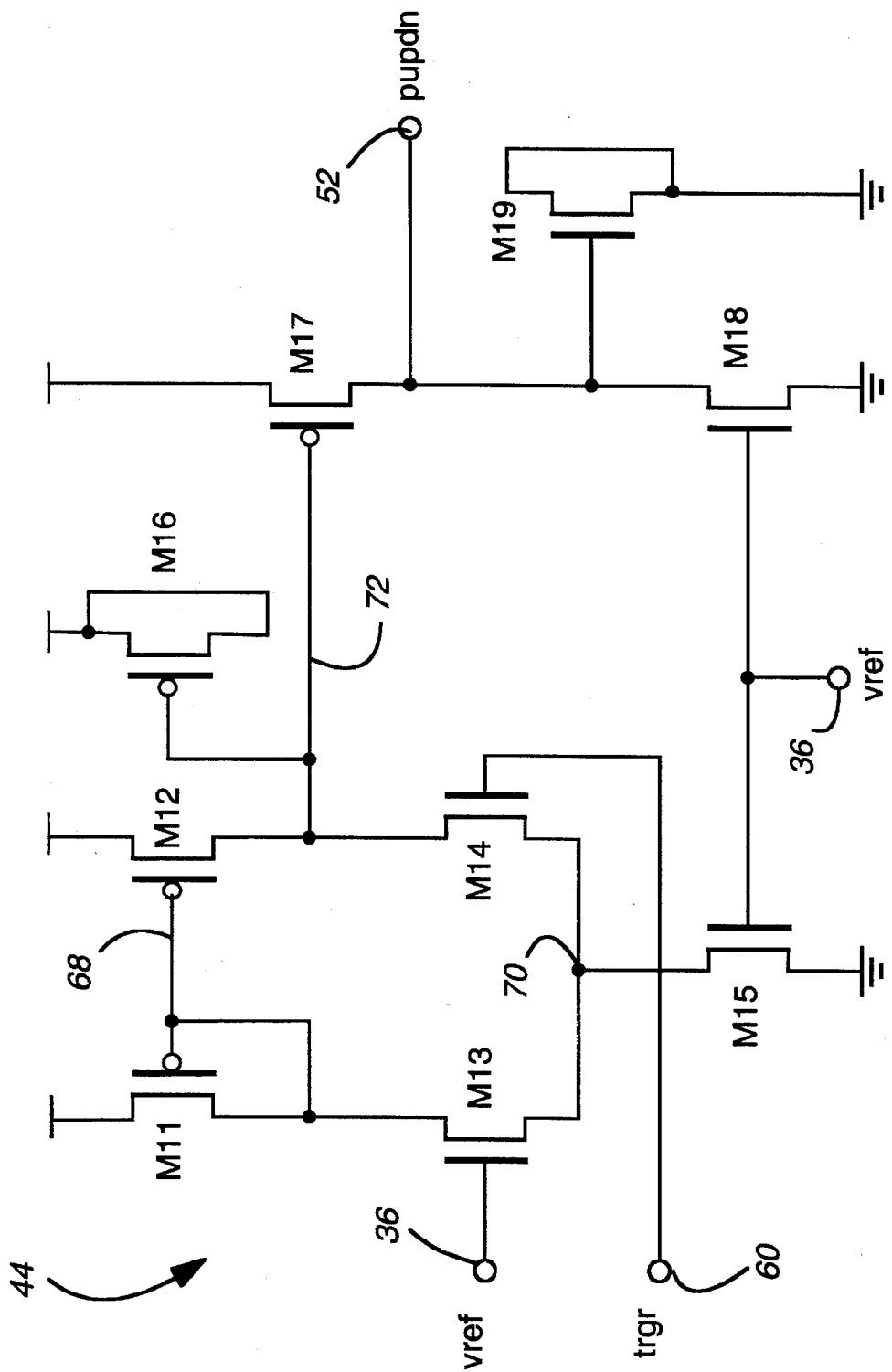

Returning to the description of the second power supply portion 16B, the transistor-level diagram of comparator 44 is shown in FIG. 7. Comparator 44 has an input stage including an active P-channel current mirror load consisting of transistors M11 and M12, whose gates are coupled together at node 68. The input stage further includes a differential pair of transistors M13 and M14 coupled to the active load for receiving the VREF and TRGR signals at nodes 36 and 60. Bias current for the input stage is provided by transistor M15. The drain of transistor M15 is coupled to node 70, which is also the source of transistors M13 and M14, and the gate of transistor M15 is coupled to VREF at node 36. The output section of comparator 44 includes a P-channel transistor M17 whose gate is coupled to the input section via conductor 72, and bias transistor M18 whose gate is coupled to VREF. The drains of transistors M17 and M18 are coupled together and to the output node 52. Comparator 44 is compensated by two transistors configured as capacitors by shorting the drain and source together. The gate of transistor M16 (one plate of the capacitor) is coupled to node 72, and the shorted source-drain (the other plate) is coupled to VDD. The capacitance of transistor M16 is about 0.4 picofarads. Output node 52 is loaded with the capacitance of transistor M19, which is also about 0.4 picofarads. The purpose of the M16 and M19 transistor capacitances is to ensure the power-up of comparator 44 in the correct state.

Figure 8:
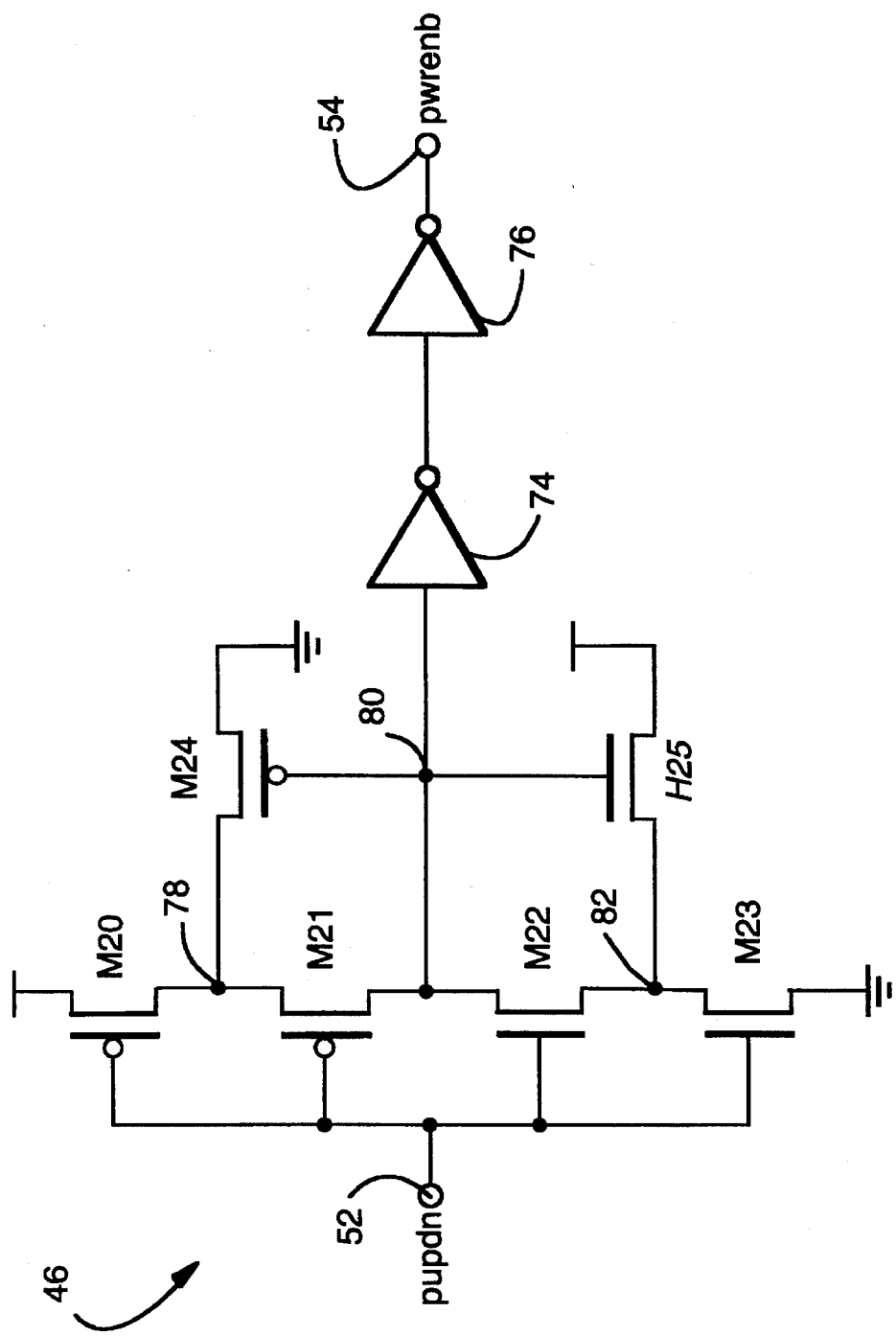

The transistor-level diagram of Schmitt trigger inverter 46 is shown in FIG. 8. Inverter 46 includes P-channel transistors M20 and M21, and transistors M22 and M23 coupled together in a standard cascoded inverter structure. The gates of transistors M20–M23 are coupled together to form the input 52 of inverter 46. The drains of transistors M21 and M22 are coupled together at node 80. The gate of P-channel transistor M24 is coupled to node 80 and the drain is coupled to node 78. The gate of transistor M25 is coupled to node 80 and the drain is coupled to node 82. Transistors M20, M23, M24 and M25 are used to modify the input switching threshold of Schmitt trigger inverter 46 in response to the input signal at node 52 and to provide the hysteresis in the transfer function. Serially-connected inverters 74 and 76 are coupled to node 80 to condition the waveform at that node and to provide a clean digital signal with sharp edges at output node 54.

Figure 9:
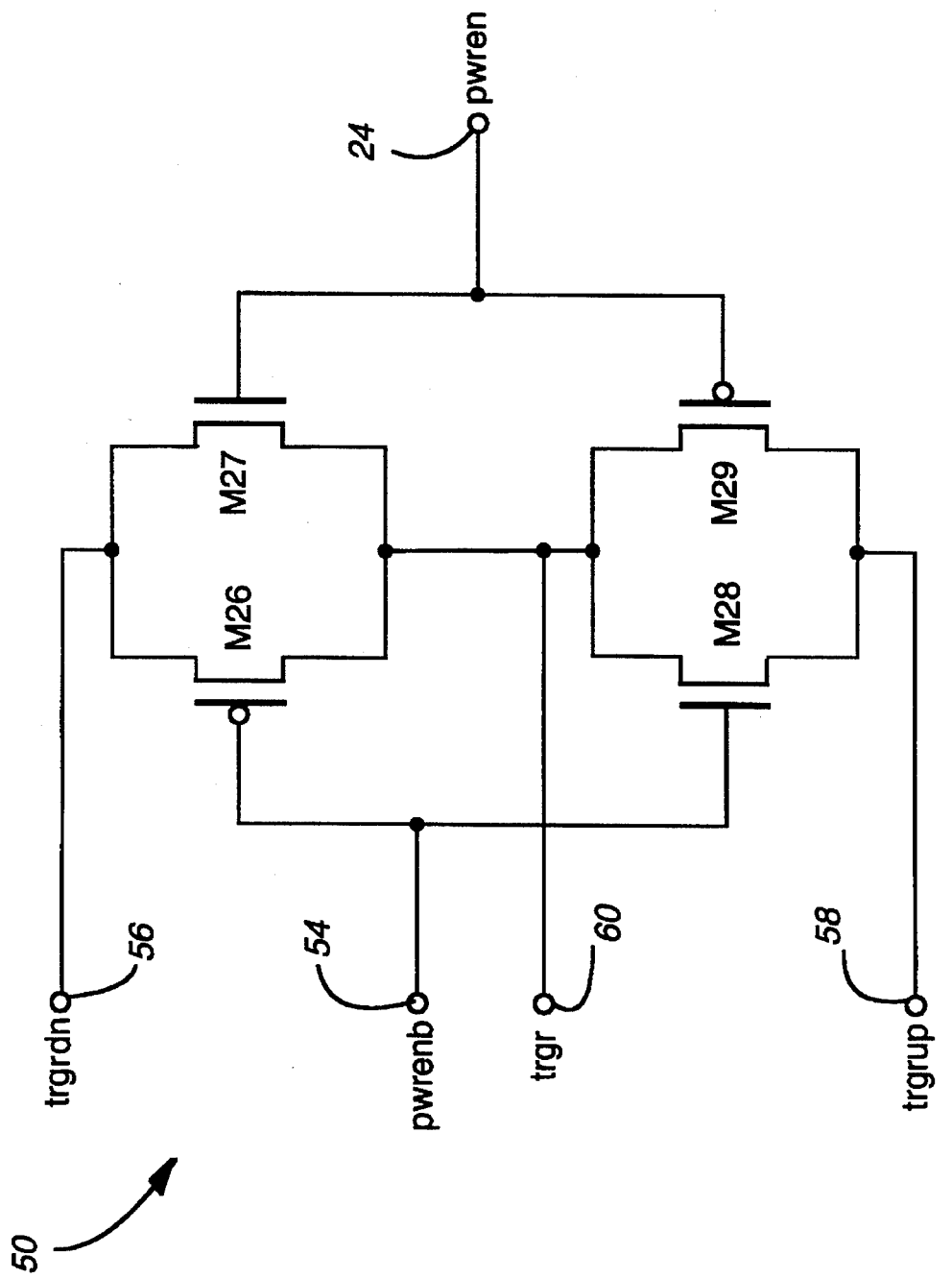

The transistor-level diagram of the analog multiplexer 50 is shown in FIG. 9, which includes two complementary-pair switches, each switch having two ends and two opposite polarity control nodes. P-channel transistor M26 and transistor M27 have current paths connected in parallel and form a first switch, transistor M28 and P-channel transistor M29 also have current path connected in parallel and form a second switch. The two switches are coupled together at node 60 to form the output of multiplexer 50, which provides the TRGR signal. The opposite ends of the two switches receive the trigger voltages at nodes 56 and 58. The control nodes, which are the gates of the transistors, are cross-coupled from one switch to the other and to nodes 54 and 24. For example, the gate of transistor 26 in the first switch is coupled to the gate of transistor 28 in the second switch to receive the PWRENB signal at node 54.

In operation, power supply circuit 16 generates the VDD power and GND ground signals on conductors 26 and 28 to power the RF/ID circuit 18 as soon as any signal is received by antenna 12. The power supply circuit 16 also constantly monitors the VDD power signal waveform and generates a PWREN power enable indication when the VDD power signal waveform rises above a predetermined power-up threshold level. The PWREN power enable indication is removed when the power signal waveform falls below a predetermined power-down level. The power-up and power-down threshold levels are generated in sequence in response to the VDD power supply voltage waveform. More specifically, the power enable circuit 16B generates the TRGRDN and TRGRUP trigger signals that are proportional to the VDD power signal and receives an internally generated VREF reference signal. The power enable circuit 16B compares the TRGRUP trigger signal to the VREF reference signal and generates the power enable indication if the TRGRUP trigger signal is greater than the VREF reference signal. When the transponder 10 is powered down by removing it from the electric field, the voltage level of the VDD signal correspondingly decreases. The power enable circuit 16B thus subsequently compares the TRGRDN trigger signal to the VREF reference signal and removes the PWREN power enable indication if the TRGRDN trigger signal is less than the VREF reference signal.

Figure 10:
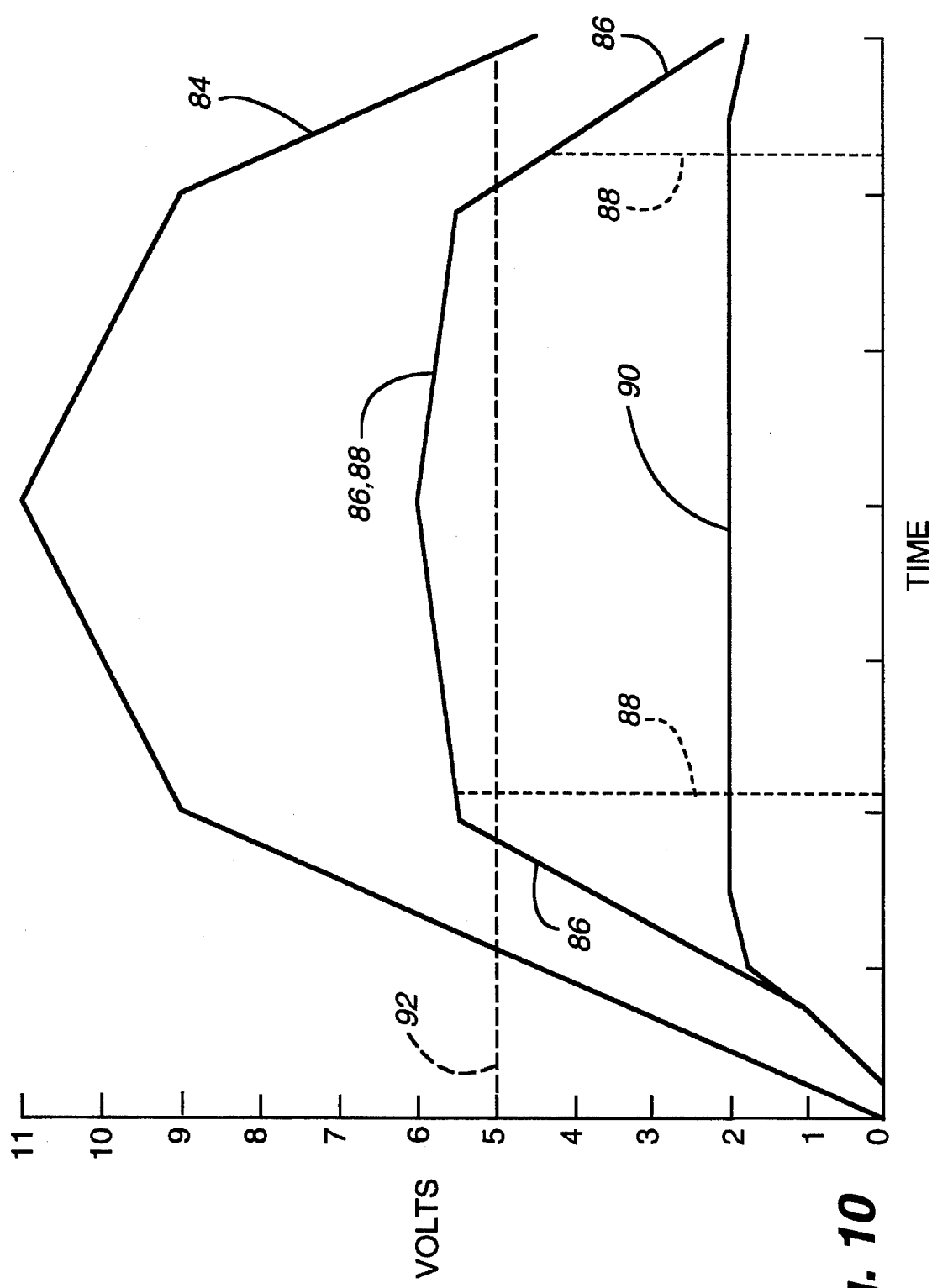
FIG. 10 is a timing diagram from a computer simulation showing the waveform associated with four nodes in the power supply.

The operation of power supply 16 can best be understood by referring to the timing diagram of FIG. 10 in which all signals are generated in response to a simulated electric field triangle waveform. In FIG. 10 waveform 84 represents the ACPLUS signal (referenced to the ACMINUS signal), waveform 86 represents the VDD power signal, waveform 88 represents the PWREN power enable signal, waveform 90 represents the VREF reference signal, and voltage level 92 represents a five-volt midpoint of a nominal power supply voltage range. The transmitted triangle electric field waveform received by antenna 12 is not shown in FIG. 10. In FIG. 10 the X-axis units are arbitrary time and the Y-axis units are volts. At an initial time, no energy is received by antenna 12 and thus all waveform voltages are at zero volts. As the energy received by antenna 12 increases, the ACPLUS signal voltage also increases. None of the other waveforms track the ACPLUS signal because of insufficient internal bias voltage. After the ACPLUS voltage reaches about a volt or so, both the VDD power signal and the VREF reference voltage begin to move and increase in proportion to the ACPLUS signal voltage. When the ACPLUS voltage reaches about five volts, the VREF and VDD signals diverge. The VREF voltage stabilizes at about two volts, whereas the VDD voltage continues to linearly increase in response to the ACPLUS voltage. After the VDD waveform crosses the five volt level, it is regulated and becomes less sensitive to further energy increases in antenna 12. Similarly, as a consequence of the regulation the ACPLUS voltage increases at a slower rate. Shortly after regulation begins, the VDD waveform crosses the power-up threshold voltage, and the PWREN power enable indication is asserted. This is depicted by the dashed line of waveform 88. Once the PWREN signal is asserted, it tracks the VDD waveform. The VREF waveform remains substantially constant. At the midpoint of the timing diagram, the input triangle waveform decreases, and so do the ACPLUS, VDD, and PWREN signals, while the VREF waveform still remains substantially constant. As the VDD voltage continues to decrease, it falls out of regulation and begins to decrease at a faster rate. Once the VDD waveform passes below the power-down voltage threshold, which is less than five volts in FIG. 10, the PWREN power enable signal is de-asserted and falls back to zero volts. Again, this is depicted by the second dashed line of waveform 88. The VDD waveform continues to decrease at the fast rate and eventually the VREF voltage also decreases. As the input triangle waveform falls to zero, all waveforms shown correspondingly fall to zero.

Figure 11:
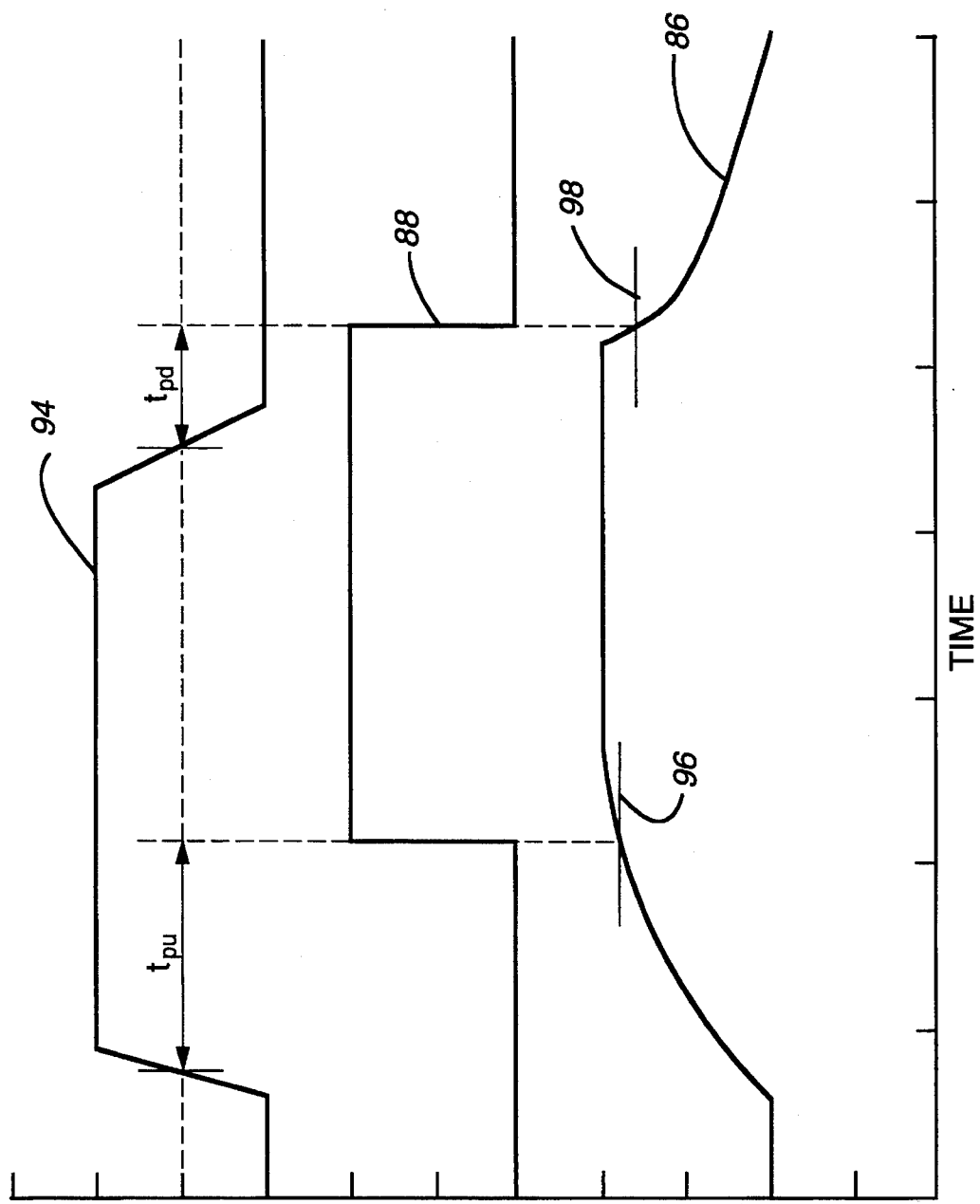
FIG. 11 is a timing diagram of electric field waveform and the waveforms associated with two nodes in the power supply as the RF/ID card is swept through the electric field of the reader/controller.

Referring now to the timing diagram of FIG. 11 the relative timing of the VDD power supply waveform 86, the PWREN waveform 88, and the electric field waveform 94 are shown as the RF/ID card is swept through the electric field of the reader/controller. Note that the VDD waveform 86 begins to increase simultaneously with the increasing electric field. There is a delay, however of $t_{PU}$ between a nominal electric field level and the leading edge of the PWREN signal. There is also a delay of $t_{PD}$ between the nominal electric field level and the trailing edge of the PWREN signal. The delays are caused by the power supply holding capacity of ferroelectric capacitor 42. Levels 96 and 98 represent the power-up and power-down voltage threshold levels, respectively.

The method of the present invention, in particular the exact method of generating the PWREN signal, is critical to protect the memory contents of RF/ID circuit 18. To properly operate the non-volatile memory resident on the RF/ID circuit 18, the PWREN signal is generated to indicate when it is allowable to operate the memory and when it is not.

Initiating and terminating the operation of the memory when there is sufficient operating voltage assures that the memory is always in a known state. Operation for another read/write cycle can properly resume once the transponder is again powered up. Typically, most memory circuits include a "precharge" or "chip enable" input that controls the operation of the memory. Properly asserting a logic signal at these inputs prevents the memory from being written to or read from. These inputs, or other similar inputs, can be used in conjunction with the PWREN signal to control memory operation in RF/ID circuit 18.

Having described and illustrated the principles of the invention in a preferred embodiment thereof, it is appreciated by those having skill in the art that the invention can be modified in arrangement and detail without departing from such principles. We therefore claim all modifications and variation coming within the spirit and scope of the following claims.

What is claimed is:

1. A power supply for a portable RF/ID transponder comprising:

a full wave rectifier having an input for receiving a signal from an antenna and outputs for providing power supply and ground voltages, the power supply voltage having a corresponding time varying voltage waveform;

a clamping circuit for regulating the power supply voltage;

a filter capacitor coupled between the power supply and ground outputs of the full wave rectifier; and a power enable circuit for constantly monitoring the supply voltage waveform and for providing a power enable indication after the supply voltage waveform rises above a predetermined power-up threshold level and for removing the power enable indication when the supply voltage waveform falls below a predetermined power-down level, wherein the power-up threshold level and power-down threshold level are distinct levels representing the limits of an acceptable power supply voltage range.

2. A power supply as in claim 1 in which the power enable circuit further includes:

circuitry for generating distinct first and second trigger voltages, each proportional to the power supply voltage;

circuitry for comparing the first trigger voltage to an internally generated reference voltage to provide the power enable indication; and circuitry for subsequently comparing the second trigger voltage to the reference voltage to remove the power enable indication.

3. A power supply as in claim 1 in combination with an RF/ID circuit for receiving and transmitting signals through the antenna, the RF/ID circuit having inputs for receiving the power enable signal, power supply voltage, and ground voltage.

4. The combination of claim 3 in which the power supply and RF/ID circuit are integrated together on a single integrated circuit.

5. The combination of claim 3 in which the RF/ID circuit includes a ferroelectric memory for storing signals received through the antenna.

6. A power supply as in claim 1 further comprising a diode having an anode coupled to the output of the full wave rectifier and a cathode for providing the power supply voltage.

7. A power supply as in claim 1 in which the clamping circuit includes means for sinking current from the power supply output of the full wave rectifier in response to an increase in the power supply voltage above a nominal level.

8. A power supply as in claim 1 in which the filter capacitor comprises a ferroelectric capacitor.

9. A power supply as in claim 1 embodied in a portable, RF/ID transponder.

10. A power enable circuit for a portable RF/ID transponder comprising:

a comparator having a first input for receiving a reference voltage, a second input, and an output for providing a power enable indication;

a trigger level generating circuit for generating distinct first and second trigger voltages, each proportional to a power supply voltage; and an analog multiplexer having a control input coupled to the output of the comparator, first and second inputs for receiving the first and second trigger voltages, and an output coupled to the second input of the comparator.

11. A circuit as in claim 10 in which the first and second trigger voltages are generated in sequence in response to a power supply voltage waveform.

12. A circuit as in claim 10 in which the comparator further comprises inverting and non-inverting outputs.

13. A circuit as in claim 12 in which the analog multiplexer comprises two complimentary-pair switches, each switch having two ends and two opposite polarity control nodes, wherein the two switches are coupled together at one end to form the output of the multiplexer, the opposite ends of the two switches receive the first and second trigger voltages, and the control nodes are cross-coupled from one switch to the other and to the inverting and non-inverting outputs of the comparator.

14. A circuit as in claim 10 in which the trigger level generating circuit comprises three resistors in series connection having two intermediate nodes for generating the first and second trigger voltages, wherein a first resistor receives the power supply voltage and a third resistor receives a ground voltage.

15. A circuit as in claim 10 further comprising a voltage reference generator for supplying the reference voltage.

16. A circuit as in claim 15 in which the voltage reference generator comprises:

a reference node having an associated reference voltage;

a second node;

first and second resistors;

first and second transistors each having a controlled current path and a control node;

wherein the first resistor is coupled between the reference node and a source of the supply voltage, the second resistor is coupled between the second node and ground, the current path of the first transistor is coupled between the source of power supply voltage and second node, and the control node of the first transistor is coupled to the reference node, and the current path of the second transistor is coupled between the reference node and ground, and the control node of the second transistor is coupled to the second node.

17. A circuit as in claim 10 embodied in a portable RF/ID transponder.

18. A method of operating a mobile RF/ID transponder circuit comprising the steps of:

provinding an RF/ID transponder circuit having a ferroelectric memory that is resident on the RF/ID transponder circuit, generating power and ground signals within the RF/ID transponder circuit, the power signal having a corresponding time varying waveform;

constantly monitoring the power signal waveform;

generating a power enable indication to the RF/ID transponder circuit when the power signal waveform rises above a predetermined power-up threshold level;

removing the power enable indication to the RF/ID transponder circuit when the power signal waveform falls below a predetermined power-down level, and allowing operation of the ferroelectric memory only when the power enable indication is present.

19. The method of claim 18 further comprising the step of filtering the power signal with a ferroelectric capacitor.

20. The method of claim 18 further comprising the steps of:

internally generating first trigger and second trigger signals proportional to the power signal; and internally generating a reference signal.

21. The method of claim 20 further comprising the steps of:

comparing the first trigger signal to the reference signal; and generating the power enable indication if the first trigger signal is greater than the reference signal.

22. The method of claim 21 further comprising the steps of:

subsequently comparing the second trigger signal to the reference signal; and removing the power enable indication if the second trigger signal is less than the reference signal.

\* \* \* \* \*